June 24, 1924.
D. A. BUELL
1,499,288
GREASE CUP PROTECTOR
Filed April 29, 1922
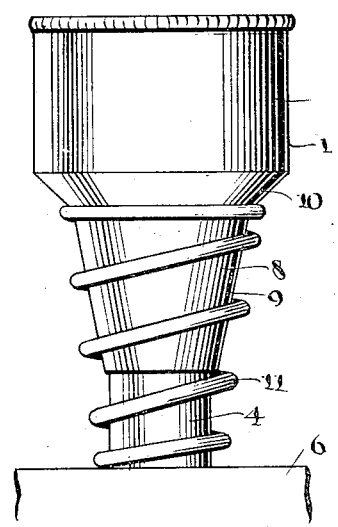
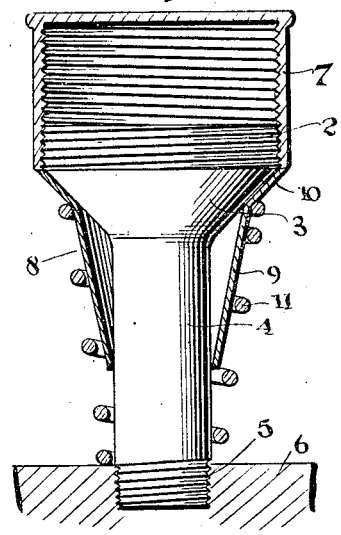
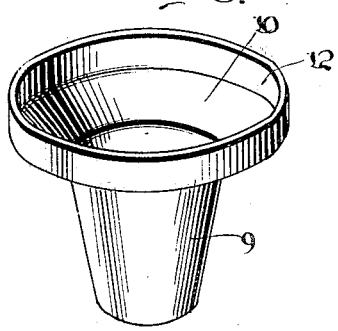
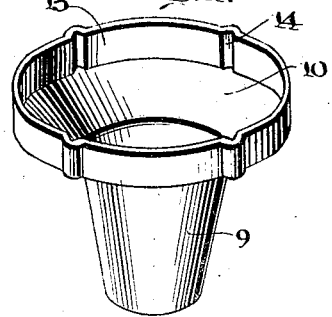
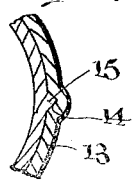
WITNESSES
RE Rousseau
INVENTOR
D. A. Buell,
BY Munn &co.
ATTORNEYS Patented June 24, 1924.

1,499,288

UNITED STATES PATENT OFFICE.

DELBERT AUSTIN BUELL, OF HARTLAND, MICHIGAN; GEORGE D. BUELL ADMINISTRATOR OF THE SAID DELBERT AUSTIN BUELL, DECEASED.

GREASE-CUP PROTECTOR.

Application filed April 29, 1922. Serial No. 557,350.

*To all whom it may concern:*

Be it known that I, DELBERT A. BUELL, a citizen of the United States, and a resident of Hartland, in the county of Livingston and State of Michigan, have made certain new and useful Improvements in Grease-Cup Protectors, of which the following is a specification.

My invention relates to grease cups and more particularly to protectors therefor, and it consists in the combinations, constructions and arrangements herein described and claimed.

An object of my invention is to provide a simple, inexpensive and effective device which is adapted to be applied to grease cups of a well known or standard type of construction to protect the normally exposed threads of the cup against dirt, mud and the like.

A further object of my invention is to provide a protector of the character described which can be readily applied and which will not in any way interfere with the removal or attachment of a grease cup to a bearing in the usual manner.

Other objects and advantages will be apparent from the following description and the novel features of the invention will be particularly outlined in the appended claim.

My invention is illustrated in the accompanying drawings forming part of this application, in which:—

Figure 1 is a side elevation of a grease cup applied to a bearing and equipped with a practical embodiment of the invention;

Figure 2 is a vertical section through the apparatus exhibited in Figure 1;

Figure 3 is a perspective view of a modified form of protector embodying the invention;

Figure 4 is a perspective view of another modified form of protector, and,

Figure 5 is a fragmentary plan sectional view, showing the application of the modification shown in Fig. 4 to a grease cup.

Referring now to the drawings, and particularly to Figs. 1 and 2 thereof, I show a lubricant cup which is indicated generally at 1 and is of conventional construction, consisting of an externally threaded body 2 merged by a tapered portion 3 into a stem 4 which is threaded at its lower end for application, as at 5, to a bearing 6. The lubricant cup also includes a cap portion 7 which is threaded internally to fit the externally threaded body portion 2. The construction described so far is ordinary and is adapted to hold the relatively stiff or viscid lubricant such as is ordinarily used in lubricant receptacles, and cups provided on agricultural implements, road working machinery, automotive vehicles and the like. As is well known, the cap portion 7 must be removed repeatedly in order that lubricant may be supplied to the cup. Dirt, mud and other foreign matter accumulate upon the threads of the body portion 2 and the cap portion 7, and result in the wearing away of the threads and the impairment of the lubricant cup as well as occasioning difficulty and loss of time and labor in the removal and application of the cap to the body of the lubricant cup.

In carrying out my invention in the form now preferred by me, I provide a protector 8 which comprises an inverted frusto-conical body 9 adapted to encircle the stem and being merged at its upper end into an outwardly flaring portion 10 which is adapted to closely contact the face of the tapered portion 3 of the lubricant cup and to abut the lower end of the cap portion 7 in such manner as to have a dust-proof fit with the latter when the body 9 is moved upwardly as far as possible in respect to the cap portion 7.

A spiral expansion spring 11 is disposed upon the body 9 of the protector and upon the lower portion of the stem 4 to react at its lower end against the bearing 6 and at its upper end against the downwardly flaring portion 10 of the protector, whereby the latter is yieldingly mounted in close engagement with the cap portion of the lubricant cup, and the threads of the cup which would otherwise be exposed are thus effectively protected.

It will be apparent that the life of a lubricant cup to which my device is applied will be lengthened beyond the normal since the threads will not be worn away on account of the accumulation of dust, grit and the like thereon, and the necessity of repeatedly screwing and unscrewing the cap from the body of the receptacle. Moreover, the protector serves to guard the stem portion of the lubricant cup from injury on account of shocks and blows which the stem would otherwise receive, since such shocks and jars will be distributed throughout the protector and dissipated without causing the injury to the stem that would otherwise result. The action of the spring 11 tends to hold the lubricant cup against movement relatively to the bearing 6, and therefore prevents accidental displacement of the lubricant receptacle.

In Figure 3 I show a modified form of protector in which the outwardly flaring portion 10 is provided with an integral substantially cylindrical extension 12 to its upper end, which extension is adapted to overlap the lower end portion of the cap 7. The operation of the modified form of protector is identical in essential respects with the operation of the preferred form.

In Figs. 4 and 5, I show still another modified form of protector in which the outwardly flaring portion 10 is provided with an integral cylindrical extension 13 to the upper end thereof, which cylindrical extension is provided with a series of vertical or longitudinally extending grooves 14 in the inner wall thereof.

The cylindrical extension 13 is adapted to overlie the lower end portion of the cap 7, and the grooves 14 engage angular projections 15 formed on the cap 7 at the lower end thereof. I may provide the same number of projections 15 as grooves 14 or a less number as for instance two of the projections 15 and four of the grooves 14.

Obviously my invention is susceptible of embodiment in forms other than those illustrated in the accompanying drawing, and I therefore consider as my own all modifications and adaptions thereof which fairly fall within the scope of the appended claim.

I claim:—

An article of manufacture, a protector comprising a frusto-conical body adapted to be slipped over the end of the stem of a lubricant cup, and an outwardly flaring portion integral with the frusto-conical portion and being adapted to encircle the body of the cup and to closely abut the lower end of the cap of the lubricant cup, and a spring member extending on the protector between the flaring portion of the latter and a support for the cup for holding the protector in abutting relation to the lower end of the cap and for tending to hold the cup against displacement from the support.

DELBERT AUSTIN BUELL.